United States Patent
Lowell et al.

(10) Patent No.: US 7,512,769 B1
(45) Date of Patent: Mar. 31, 2009

(54) PROCESS MIGRATION

(75) Inventors: David E. Lowell, San Francisco, CA (US); Yasushi Saito, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 408 days.

(21) Appl. No.: 10/959,714

(22) Filed: Oct. 6, 2004

(51) Int. Cl.
*G06F 9/26* (2006.01)
*G06F 9/34* (2006.01)
*G06F 13/00* (2006.01)
*G06F 13/28* (2006.01)

(52) U.S. Cl. .................... 711/203; 711/165
(58) Field of Classification Search ........... None
See application file for complete search history.

(56) References Cited

U.S. PATENT DOCUMENTS

| | | | | |
|---|---|---|---|---|
| 4,814,971 | A * | 3/1989 | Thatte | 714/15 |
| 6,256,751 | B1 * | 7/2001 | Meth et al. | 714/15 |
| 6,260,068 | B1 * | 7/2001 | Zalewski et al. | 709/226 |
| 6,698,017 | B1 * | 2/2004 | Adamovits et al. | 717/168 |
| 6,934,755 | B1 * | 8/2005 | Saulpaugh et al. | 709/226 |
| 2005/0091354 | A1 * | 4/2005 | Lowell et al. | 709/223 |

OTHER PUBLICATIONS

U.S. Appl. No. 10/676,665, filed Oct. 1, 2003, Lowell et al.
Lowell, David E., and Chen, Peter M., Discount Checking: Transparent, Low-Overhead Recovery for General Applications. University of Michigan Technical Report. CSE-TR-410-99. Nov. 1998, available at http://www.eecs.umich.edu/Rio/papers/discountChecking.pdf.
Milojicic, D. S., Douglis, F., Paindaveine, Y., Wheeler, R., and Zhou, S., Process Migration, ACM Computing Surveys, 32(3):241-299, 2000.
Osman, Steven, Subhraveti, Dinesh, Su, Gong, and Nieh, Jason, The Design and Implementation of Zap: A System for Migrating Computing Environments. Proceedings of the 5th Symposium on Operating Systems Design and Impementation (OSDI 2002), Boston, MA, Dec. 2002.
Rashid, Richard, Julin, Daniel, Orr, Douglas, Sanze, Richard, Baron, Robert, Forin, Alessandro, Golub, David, and Jones, Michael, Mach: A System Software Kernel. Department of Computer Science, Carnegie Mellon University, Pittsburgh, PA, after Nov. 1988.
Young, Michael, Tevanian, Avadis, Rashid, Richard, Golub, David, Eppinger, Jeffrey, Chew, Johathan, Bolosky, William, Black, David, and Baron, Robert, The Duality of Memory and Communication in the Implementation of a Multiprocessor Operating System, Proceedings of the 11th Operating Systems Principles, Nov. 1987.

* cited by examiner

*Primary Examiner*—Hyung S Sough
*Assistant Examiner*—Gary W Cygiel (57) ABSTRACT

Migrating a process between separate logical address spaces involves saving information on a state of a process running in a first logical address space in machine memory mapped to the first logical address space, remapping the machine memory containing the saved information to a second logical address space, and recovering the process in the second logical address space from the saved information.

32 Claims, 3 Drawing Sheets

PROCESS MIGRATION

BACKGROUND

A computer operating system may run on a "virtual machine" on the physical computer. In a virtual machine, if the operating system attempts to access hardware resources, the access is intercepted by a layer known as a "virtual machine monitor" (VMM), which can redirect the access to actual hardware. For example, the address space used by the operating system for main memory, known as "physical memory," may be different from the machine addresses of the actual memory hardware the operating system is actually using, known as "machine memory." Application processes may use different logical memory addresses, known as "virtual memory," The term "logical memory" is used to refer to either physical or virtual memory. The "machine memory" may be in any convenient form, for example, it may be in random access memory (RAM), or a disk file.

Memory addresses may be divided into pages, which are blocks of memory of a convenient size for administration. Pages of virtual memory may "map" into physical memory at the operating system level, and pages of physical memory may map to pages of machine memory at the VMM level. This may be done by maintaining a table that maps pages at one level to pages at another level. The pages are usually of uniform size, so that they can be handled consistently and interchanged if necessary. Depending on how a particular computer is arranged, a memory access by an application process may in practice be translated in a single stage from a virtual memory address to a machine memory address. The use of a VMM makes it possible for two or more operating systems, which may comprise two or more instances of the same operating system, to run on a single physical computer, without problems arising because one or both operating systems require exclusive control of system resources or of memory in certain address ranges.

It is sometimes desired to "migrate" a process or application from one operating system or virtual machine to another, without the interruption to user service that would be caused by closing down the process on the one operating system and restarting it on the other. This can be done by "checkpointing" the process on the first or "source" virtual machine, migrating the checkpointed process to the second or "destination" virtual machine, and restoring and resuming the process from the checkpoint. "Checkpointing" involves encapsulating and saving to memory the information that is required to enable the process to resume where it was stopped without loss of data. Checkpointing requires that sufficient data about the state of a process be saved to memory to enable the execution of process to be resumed at a later time. In current implementations, the information that is checkpointed and migrated typically consists of at least the contents of data registers, the kernel state associated with the process, and the memory state of the process. In the case of a large server application, the memory state may constitute the bulk of the size of the checkpoint. The data registers and kernel state may be stored in any convenient and suitable location. The kernel state may be represented in a logical, rather than a physical, manner.

SUMMARY

Previously proposed process migration systems have mostly been directed to migration of processes between different physical nodes in a distributed multiprocessor system. The volume of traffic and time required to copy the memory state of a process being transferred from a source node to a destination node has been a concern. Embodiments of the present invention make it possible, in the case of migration between virtual machines on a single physical node, to reduce the time required for migration, in comparison with many previous process migration systems, by reducing the amount of memory that needs to be copied at the time of migration.

DETAILED DESCRIPTION

Figure 1:
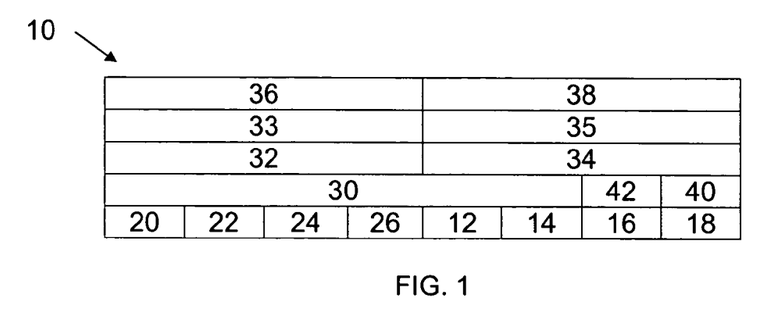
FIG. 1 is a schematic diagram of one embodiment of a computer system in accordance with an embodiment of the present invention.

Referring to the accompanying drawings, and initially to FIG. 1, one embodiment of a computer, indicated generally by the reference numeral 10, comprises machine memory divided into "pages" 12, 14, 16, 18 and other physical resources 20, 22, 24, 26. In this embodiment, the computer 10 may be a server and may be one node of a larger computing system. The physical resources 12 through 26 are separated by a virtual machine monitor (VMM) 30 (implemented as code stored on computer readable storage medium of computer 10) from one or more operating systems 33, 35 running in "virtual machines" 32, 34, each of which may support one or more application processes 36, 38.

In this embodiment, the VMM 30 isolates the virtual machines 32, 34 from each other and from the hardware 12 through 26. When an operating system 33, 35 or an application process 36, 38 acting through its operating system accesses hardware resources, the virtual machine monitor 30 intercepts the access, and directs it appropriately. For example, two operating systems 33, 35 may have physical memory address spaces that overlap, or are identical. The VMM 30 can then map pages of the physical memory used by each operating system, even pages with identical logical addresses within their respective virtual machines 32, 34, to different pages of machine memory 12-18. Each operating system 33, 35 can map pages of the virtual memory used by each application process, even pages with identical logical addresses within their respective applications' address spaces, to different pages of physical memory, which the VMM 30 maps to different pages of machine memory 12-18. For this purpose, the VMM may maintain a "page table" 40. Each "page table entry" in the page table 40 may record the mapping of a specific page of physical memory used by a specific operating system 33, 35 to a specific page of machine memory 12-18.

In this embodiment, the VMM 30 also isolates the operating systems 33, 35 from the other hardware resources 20-26. For example, if two operating systems 33, 35 expect exclusive control of a certain sort of device 20, 22, there may be two devices of that sort, and the VMM may conceal one device 22, 20, respectively, from each virtual machine 32, 34, allowing each operating system exclusive control of the device 20, 22, respectively, that it is allowed to know of. Alternatively, if there is only one device 20 available, the VMM may show to each operating system a virtual image of that device 20. The VMM may then allow each operating system exclusive control of the virtual device. The VMM then reconciles and separates conflicting demands before channeling them to the physical device 20.

Figure 2:
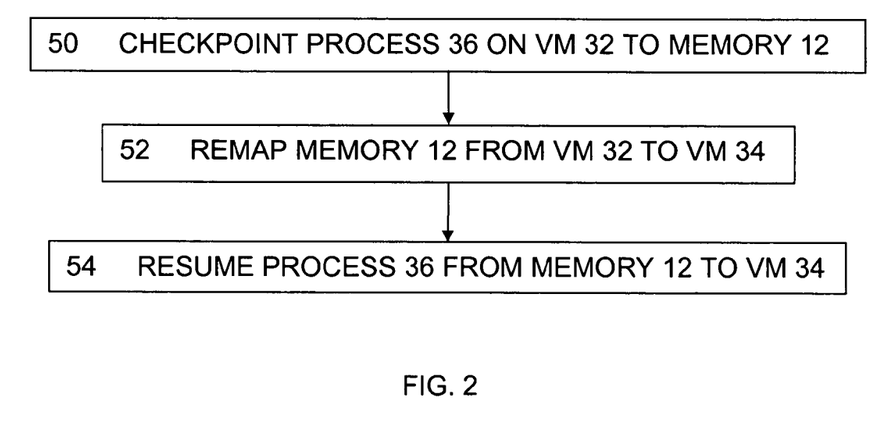
FIG. 2 is a flowchart of one embodiment of a method of process migration in accordance with an embodiment of the present invention.

Referring now to FIG. 2, in one embodiment, if it is desired to migrate the process 36 from operating system 33 to operating system 35, the migration may take place under the control of a process migration system, which may be realized at any convenient level of the computer system, for example, in the VMM 30, in the operating systems 33, 35, in a library above the operating system, or in an application or utility process 36, 38. In one embodiment, the process migration system is included in a standard library of system calls to which many application processes link at run time. The process migration system may be invoked by a human operator, or by various automatic processes.

In step 50 the process is first checkpointed. This involves encapsulating and saving to memory the information that is required to enable the process 36 to resume where it was stopped without loss of data. In this embodiment, the checkpoint is saved to memory within the operating system 33 that maps to machine memory 12. Checkpointing can thus be conducted within the operating system 33 without active interference from the VMM.

In step 52, the VMM, under the direction of the process migration system, then remaps the memory 12 so that part of the address space of the operating system 35 maps to the memory 12. "Remapping" involves altering the relationship between logical memory and machine memory so that a page of machine memory 12 is mapped to by one page of logical memory before the remapping and by a different page of logical memory after the remapping. In this embodiment, that is done by altering the page table 40 so that machine memory 12 which was mapped to by physical memory of the first virtual machine 32 before the remapping is mapped to by physical memory of the second virtual machine 34 after the remapping. In step 56, the process 36 is then restored from the saved checkpoint, and resumed. However, the restoration takes place within the operating system 35, which now maps to the memory 12. As a result, the process 36 is migrated from the virtual machine 32 to the virtual machine 34.

Figure 3:
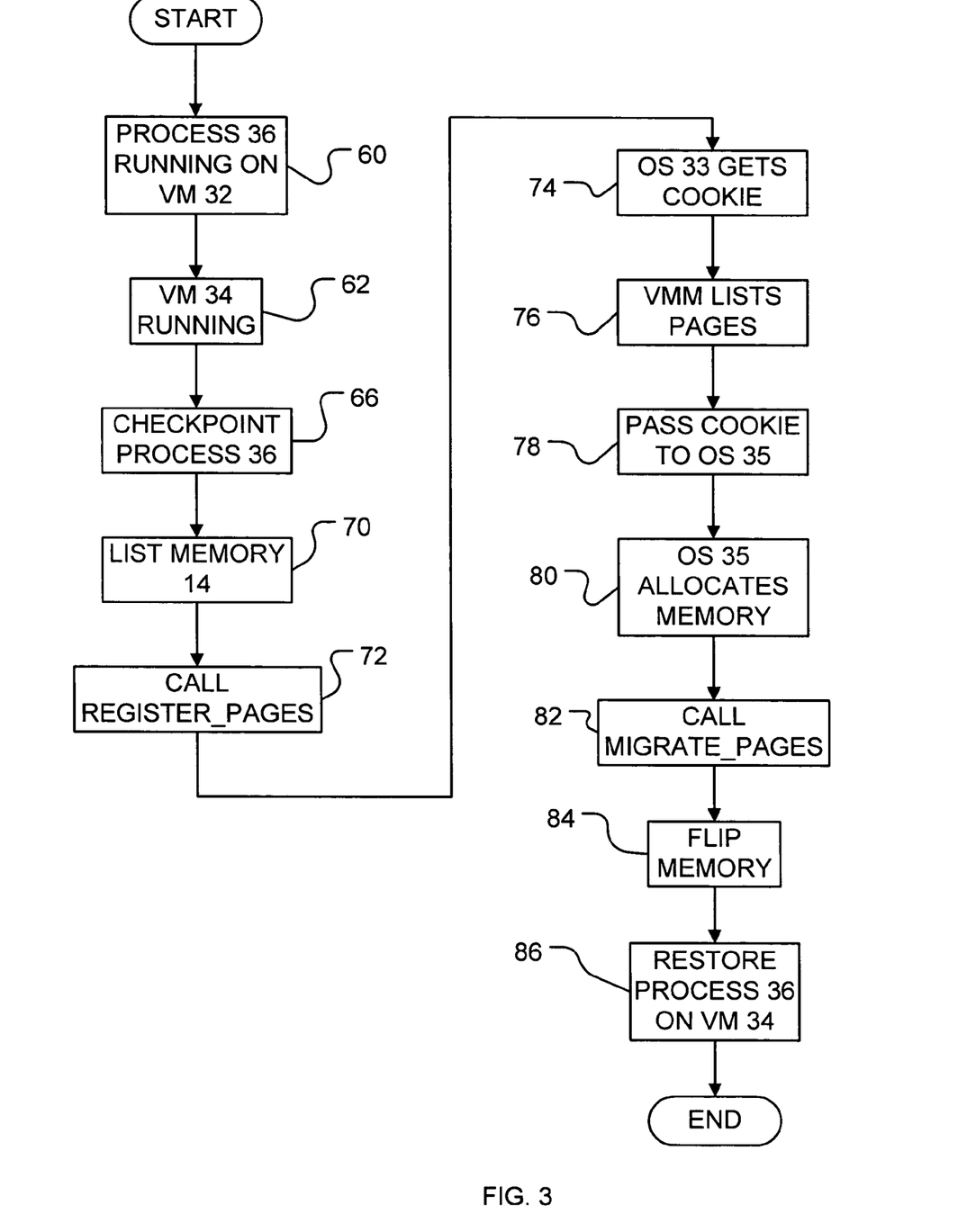
FIG. 3 is a flowchart of another embodiment of a method of process migration in accordance with an embodiment of the present invention.

Referring to FIG. 3, in another embodiment, at starting step 60 a process 36 is running on a virtual machine 32. The virtual machine 32 uses some machine memory pages 12-14 of the physical computer, but does not use all of the machine memory. This embodiment may allow the virtual machine 32 initially to use all of the machine memory that the VMM 30 makes available to virtual machines, provided that it relinquishes some of that memory at the next stage.

At some point, it is necessary or desired to migrate process 36 from virtual machine 32 to another virtual machine on the same physical computer 10.

In step 62, a second operating system 35 is running in a second virtual machine 34. The second virtual machine 34 may be started for the purpose of receiving the migrated process 36, or it may already be running.

In step 66, process 36 is checkpointed. Checkpointing requires that sufficient data about the state of the process 36 be saved to memory 12 to enable the execution of process 36 to be resumed at a later time. In the present embodiment, at least the contents of data registers and the kernel state associated with the process are saved to memory 12. In addition, at step 70 the memory state of the process 36 must be identified and preserved as part of checkpointing. In this embodiment, the memory state is in the form of pages of virtual memory used by the process 36, which map to pages of machine memory 14. The machine memory 14 may be in any suitable form. For example, the machine memory 14 may be machine RAM. For example, the machine memory 14 may be disk space, which may be a disk swap file supporting virtual or physical RAM.

The first operating system 33, or an application or utility running on the first operating system, then calls the VMM 30 via an API, recording the logical addresses of the memory pages 12 and 14 containing the checkpoint. One example of an API for use in the present embodiment, expressed as pseudocode, may read:

```
struct iovec {
void *base;
size_t len;
};
struct cookie {
char opaque [64];
};
cookie register_pages(iovec *iov, int iovlen);
void migrate_pages(iovec *iov, int iovlen, cookie c);
```

In each instance of iovec, the input parameters *base and len specify, in the form of a base address and length, a block of contiguous memory. The base address *base and the length len do not need to be the base address of a page used for memory mapping and the length of a whole number of pages. For example, if the process 36 is using only part of the page, *base and len may be the base address and length for the used part of the page. The parameters *iov and iovlen are the starting address and number of entries in a list, in which each entry is a tuple consisting of an instance of the parameters *base and len.

At step 72, a call to register_pages is made by the process migration system in the first or "source" virtual machine 22. The procedure register_pages passes the addresses of the memory pages 12 and 14 to be migrated, in the logical address space of the process migration system, to the VMM 30. At step 74, the VMM 30 returns a "cookie" identifying the page list. The "cookie" may be merely a label identifying a record of the page list in the VMM's memory, or may be a copy of the list, possibly in encrypted form and/or authenticated by the VMM. At step 76, the VMM 30 identifies the machine pages 12, 14 corresponding to the logical pages listed by register_pages. If the process migration system was running at a high level, the addresses from the register_pages list may be in physical or virtual address space. The VMM 30 can convert addresses from physical memory to machine memory, because the VMM is in control of the physical to machine mapping. In many systems, the VMM also has access to the virtual to physical mapping, because that is actually implemented in hardware or other resources under the control of the VMM. In some systems, it may be necessary for the VMM 30 to send a request to the operating system 33 for information from the operating system's virtual to physical memory mapping. If the iovec addresses do not align with page boundaries, the VMM 30 identifies the pages that contain the memory specified.

At step 78, the cookie is passed to the second or "destination" operating system 35. At this stage, the destination operating system 35 needs to know at least the number and size of the memory areas 12, 14 involved in the migration. If the cookie consists merely of a label for information held by the VMM 30, then the process migration system running in the destination virtual machine 34 may use the cookie to obtain a copy of the actual information from the VMM. If the cookie contains actual information, the destination system extracts that information.

The information may alternatively be passed from the source operating system 33 to the destination operating system 35 by any means available for communication between different virtual machines on the computer system 10 in question.

At step 80, the destination operating system 35 allocates logical memory within its own address space for the check-pointed process 36. The allocated memory areas need to correspond in number and size to the memory areas listed by the register_pages API call. In this embodiment, the logical memory allocated by the destination operating system 35 is memory that already maps to machine memory pages 16, 18.

At step 82, an API call to migrate_pages is made by the process migration system in the destination virtual machine 34, which instructs the VMM 30 to remap the memory pages 12 and 14 previously identified by register_pages to the second virtual machine 34.

In the present embodiment of the invention, in step 84 the machine memory pages 12 and 14 containing the checkpoint are "flipped" with the machine memory pages 16 and 18 corresponding to the logical memory pages previously allocated by the new virtual machine 34 at step 80. A "flip" is a procedure that starts with first logical memory pages in the first virtual machine 32 mapping to first pages of machine memory, and second logical memory pages in the second virtual machine 34 mapping to second pages of machine memory. In the flip, identical numbers and sizes of first and second logical memory pages are simultaneously remapped by altering the page table 40 so that the first logical memory pages now map to the second machine pages, and the second logical memory pages now map to the first machine pages. Effectively memory, and the information contained in that memory, is exchanged between the two virtual machines 32, 34, without any physical copying of the information being needed. The two virtual machines 32, 34 perceive a sudden change in the content of certain of their physical memory, without any change in the amount or apparent location of that memory.

The first logical memory pages and the second logical memory pages may have the same physical memory addresses within their respective operating systems 33 and 35. Alternatively, they may have different physical memory addresses within their respective operating systems 33 and 35. The first logical memory pages and the second logical memory pages may have the same virtual memory addresses in the address space of the process 36 before and after the migration, even if they have different physical memory addresses.

The VMM 30 effects the flip by altering the page table 40, so that the machine memory pages 12 and 14 containing the checkpoint are now mapped to by the logical addresses on the second virtual machine 34 that previously mapped to the pages 16 and 18, and the machine memory pages 16 and 18 are now mapped to by the logical addresses on the first virtual machine 32 that previously mapped to the pages 12 and 14. This memory "flip" is quick, because no copying of machine memory is needed, only a few changes to a table.

If a translation lookaside buffer (TLB) 42 is used, in conjunction with the page table 40, the relevant parts of the buffer are purged or updated. The TLB may be implemented in hardware of the computer system 10. A multi-tasking operating system 33, 35 may itself perform memory mapping between virtual memory addresses used by processes 36, 38, or an internal address space used by the operating system, and what the operating system believes to be physical memory. If the operating system uses the hardware TLB 42, then the actual contents of the TLB may be a composition of the operating system's memory address mappings and the VMM's memory mappings, leading directly from an application process's virtual addresses to actual machine addresses.

At step 86, the process migration system restores process 36 from the checkpoint, on the second virtual machine 34. The memory pages 12 and 14 containing the checkpoint are now mapped to the address space of the second virtual machine, so this requires no special measures. The restoration involves loading into the virtual machine 34 the register contents, kernel state, and other information that was saved to the memory 12 in step 66 or passed to the second operating system 35 in step 78. The execution of the process 36 is then resumed.

Because the migration of the process 36 from the first virtual machine 32 to the second virtual machine 34 involves only checkpointing, remapping of memory 12 and 14 in the page table 40, and restoring from the checkpoint, it is a quick process, and can in many cases be carried out without a noticeable interruption in the service to the users of the process 36. If the amount of main memory 14 used by the process 36 is large, there may be a considerable saving in time because it is not necessary actually to copy the contents of the memory from machine memory to which the first virtual machine 32 maps into machine memory to which the second virtual machine 34 maps.

Figure 4:
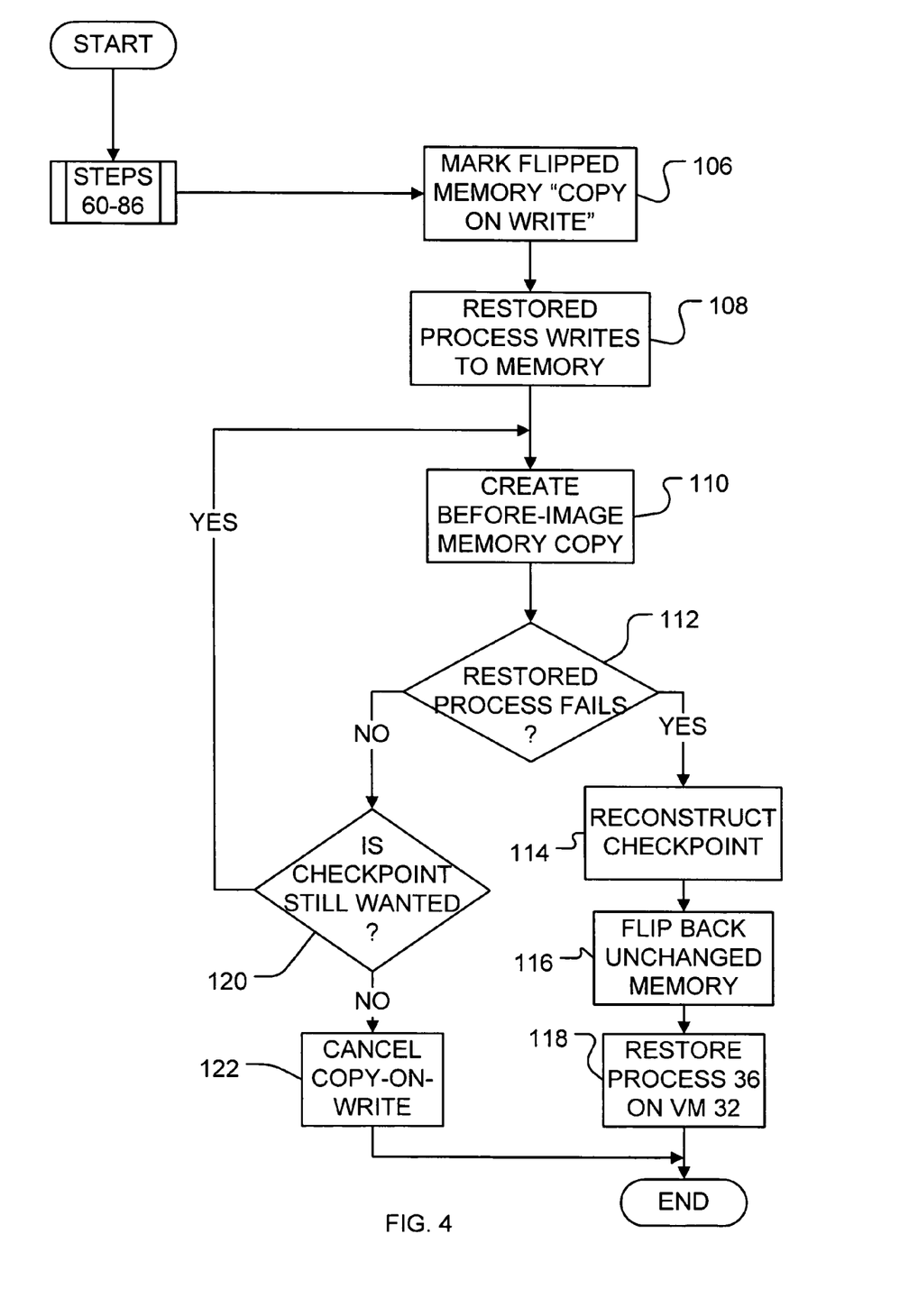
FIG. 4 is a flowchart of another embodiment of a method of process migration in accordance with an embodiment of the present invention.

Referring now to FIG. 4, at step 106, the machine memory pages 12 and 14 may be marked "copy on write" by the VMM 30. As the restored process 36 operates, in step 108 it may alter the data stored in the memory 14. If memory is marked "copy on write," the permissions for the memory pages 12 and 14 in the page table 40 are set so that any attempt to write to one of those pages will create a fault that can be trapped by the VMM 30 or other entity controlling the write. The write attempt at step 108 is held suspended. At step 110, the VMM then makes a copy of the affected page, known as a "before-image," in a part of the machine memory that is not mapped to by the physical memory space of any operating system 33, 35. Once the page has been copied, the permissions for the original page 14 are changed to allow the write attempt to proceed. Subsequent writes to the same page proceed without objection, and without involving the before-image copies of the altered pages, which are preserved as originally migrated.

Then, if the process 36 alters the content of the memory after the migration, before-image copies of the pages as originally migrated, as well as the current altered pages, are saved. In the present embodiment, the VMM 30 saves the before-image copies on pages of machine memory that exist on the physical computer 10 and are under the control of the VMM 30 but are not mapped to by any virtual machine 32, 34. The altered copies are stored in machine memory mapped to by the virtual memory of the process 36. The virtual memory of the process 36 continues to map to any unaltered pages, that is to say, pages to which the process 36 has not written since the migration. Thus, the process 36 uses the altered and the unaltered pages. The process 36 has no access to the before-image copies that exist only for the altered pages.

The VMM maintains a log of the "before images" of the altered pages. Some overhead is incurred because of the need to copy pages of machine memory. However, in many cases the rate of copying of pages will be low and, as explained with reference to step 120 below, only a small part of the total memory pages 14 may ever be copied. In addition, because the copying occurs only on writes to memory, in many cases the writes can be queued if the resources for copying are not immediately available. In addition, because this copying arises only after the process 36 has been restarted, it does not contribute to down-time while the process 36 is unavailable to users during migration.

Alternatively, the copy-on-write could be implemented within the second operating system 35, in which case the before-image copies are kept in machine memory to which physical memory of the second operating system maps.

In step 112, it may be determined that the restored process 36 has failed. Such failure may be caused by a failure in the checkpointing and restoring procedures. For example, even if the virtual machine 32 has been checkpointed completely and correctly, the checkpoint may not restore correctly if a patch or upgrade alters the operating system 35. For example, the restored process 36 may fail to run correctly because some resource, such as a dynamically linked library or other file that was not included in the memory flip, is not present in the new virtual machine 34.

In the event of a failure, in step 114 the original state of the checkpoint is reconstructed by reference to the VMM's log of before-images. The pages may be remapped so that the unchanged checkpoint is reconstructed in the physical or virtual memory of the second virtual machine 34, identically to the state of that memory immediately after the flip in step 84. Then, at step 86 the pages are flipped back to the first virtual machine 32. In some embodiments it is easier to restore the process 36 if the pages 12 and 14 are returned to the same logical addresses that they occupied at the beginning of step 84, in exchange for the pages 16 and 18 that were flipped to the first virtual machine 32 in step 84. In step 118 the process 36 is restored from the checkpoint on the first virtual machine 32.

If it is intended for this reverse migration to be possible, in the present embodiment the first virtual machine 32 and operating system 33 may be maintained unaltered and active but not supporting any user processes. That reduces the probability that the checkpoint will not restore on the first virtual machine because of deliberate changes to the operating system 33 or because of changes caused by subsequent processes that are not reversed by restoring the checkpoint. Even if the first virtual machine 32 is used between the migration at steps 64 to 86 and the reverse migration at steps 114 to 118, the flipped memory pages 16 and 18 may be kept unused by the first virtual machine 32, because anything stored on those memory pages will be lost in the reverse migration. In order to keep the memory pages 16 and 18 unused, the original instance of the process 36 on the first operating system 33 may be kept as a placeholder, retaining possession of the logical pages on the first virtual machine 32 that map to the flipped memory pages 16 and 18.

The value of being able to migrate the process 36 back to the original virtual machine 32 in steps 114 to 118 decreases over time. Because it is the original checkpoint that is restored, any work done after the original migration is lost. The cost in time and resources of rerunning the lost work increases with time. The probability that the reverse migration will be successful decreases with time, because it is difficult to preserve the state of the first virtual machine 32 absolutely perfectly on an operating computer 10. If the migrated process 36 resumes on the second virtual machine 34 at all, the probability of a failure related to the original migration decreases with time, because many of the possible causes of failure either are ephemeral or are likely to be discovered fairly soon.

Therefore, in step 120 a decision is made whether it is still worth retaining the checkpoint, or whether the migration and recovery are regarded as successful. The criterion for determining this may be time, some measure of the amount of activity in process 36 since it was migrated, such as a count of transactions, the number of memory pages 14 that have been copied, or a combination of factors. The decision may be made automatically, by the VMM 30 or by a monitoring utility, or may be made by a human operator. If it is determined that the checkpoint is not worth retaining, then in step 122 the copy-on-write status of any uncopied memory pages 14 is released, allowing future changes to those pages to be made without creating a copy. The memory occupied by the before-images of any copied pages 14 and by the pages 12 with the virtual machine state is freed for other uses.

Although the invention has been described and illustrated with reference to exemplary embodiments thereof, it will be understood by those skilled in the art that various changes, omissions, and additions may be made thereto, without departing from the spirit and scope of the invention as recited in the attached claims. For example, in an alternative form of this embodiment, the memory pages do not need to be flipped symmetrically.

Alternatively, if there is machine memory available to the VMM 30 that at the beginning of step 84 is not mapped to by any virtual machine 32, 34, then the machine memory pages 12 and 14 that are remapped away from the first virtual machine 32 could be replaced by pages of previously unmapped memory and/or the pages 16 and 18 that are removed from the second virtual machine 34 to free their logical addresses for the pages 12 and 14 could become unmapped memory.

If memory may be remapped asymmetrically, in the event of a failure, in step 114 the memory pages 12 and 14 containing the unchanged copy of the checkpoint, in the form of unaltered pages and before-image pages, may be located, without being remapped. The VMM 30 may then remap the located pages back to their original logical addresses in the first virtual machine 32. However, the pages 16 and 18 that are flipped out of the first virtual machine 32 are then distributed by the flip to the logical addresses previously occupied by the unaltered and before-image copies of the pages 12, 14. Some of these addresses may be logical addresses in the second virtual machine 34, and some of them may be among the unmapped pages used by the VMM 30 for the copy-on-write function. These machine pages 16 and 18 may be further remapped, either simultaneously or subsequently, if it is desired to maintain them as a logical group.

Alternatively, before the reverse remapping the machine pages 12 and 14 may be temporarily remapped to an orderly block of logical addresses within the second virtual machine 34, but not necessarily to the same addresses they originally occupied.

Alternatively, instead of flipping pages, the pages 12 and 14 could be remapped to physical addresses on the second virtual machine 34 that did not previously map to any machine address, and/or the physical addresses on the first virtual machine that mapped to the pages 12 and 14 before the flip could be left not mapping to any machine pages. The VMM 30 typically has sufficient control over the mapping of physical to machine pages to implement this without disturbing the operation of the virtual machines 32, 34.

Alternatively, if the second virtual machine 34 does not initially have sufficient unused physical memory for the pages 12, 14 but does have unused address space, new physical memory could be added to the second virtual machine before step 80.

In another alternative embodiment, when the machine memory pages 14 are identified for migration at step 70, the pages 14 may be duplicated, and only the duplicate set may then be flipped or remapped to the second virtual machine 34.

Even if the pages 14 are duplicated as part of the migration procedure, there may still be a significant saving in time, because copying pages within an operating system is quicker than copying between operating systems, even on a single physical computer. In addition, if the migration is planned in advance, pages that are not frequently changed may be duplicated in advance, so that only a flip or remapping is necessary at the time of migration. In this embodiment, if the migration fails the process 36 can be recovered on the first operating system 33 without a reverse remapping of the machine memory pages 14, as long as the originals of the duplicated pages 14 are still available to the first virtual machine 32.

In the embodiments shown in the drawings, the computer 10 has two virtual machines 32, 34, each containing a single operating system 33, 35, supporting a single application process 36, 38. However, more complicated arrangements are, of course, possible. The computer 10 and the VMM 30 may support more than two virtual machines. A single virtual machine 32, 34 may contain more than a single operating system 33, 35 provided that all systems are able to coexist peacefully within the single undivided machine 32, 34. A single operating system 33, 35 may support more than one application process 36, 38.

What is claimed is:

1. A method of migrating a process between separate logical address spaces, comprising:
   saving information on a state of a process running in a first logical address space in machine memory mapped to the first logical address space;
   remapping the machine memory containing the saved information to a second logical address space; and
   recovering the process in the second logical address space from the saved information;
   wherein remapping memory between two logical address spaces comprises matching memory to which one logical address space maps and that is to be remapped with other memory to which another logical address space maps, and flipping the mapping of said memory to be remapped and said other memory between said one logical address space and said other logical address space.

2. A method according to claim 1 comprising, when the recovered process alters the contents of the remapped memory, copying at least an affected part of the memory and maintaining both altered and unaltered copies.

3. A method according to claim 2, further comprising:
   determining whether the recovery has failed or the recovered process has failed and, in the event of failure,
   remapping said remapped memory to the first logical address space using the unaltered copies of the altered memory, and
   attempting to recover the process in the first logical address space.

4. A method according to claim 2, further comprising monitoring the operation of the recovered process and, after achieving a criterion of successful recovery, ceasing to maintain unaltered copies of memory altered by the process.

5. A method according to claim 1, wherein said memory to be remapped and said other memory have identical logical addresses within their respective logical address spaces.

6. A method according to claim 1, wherein said memory to be remapped and said other memory have different logical addresses within their respective logical address spaces.

7. A computing device comprising a virtual machine monitor arranged to run processes in separate virtual machines using memory in separate logical address spaces mapped to respective parts of a common machine memory, comprising:
   a system comprising a computer readable storage medium having computer readable program code embodied therein that when run in a first virtual machine on the computing device records as a checkpoint in machine memory the state of the first virtual machine when running a process; and
   a system comprising a computer readable storage medium having computer readable program code embodied therein that when run in a second virtual machine on the computing device restores a process from a checkpoint recorded in machine memory;
   wherein the virtual machine monitor comprises a computer readable storage medium having computer readable program code embodied therein that when run remaps machine memory containing the checkpoint from logical addresses in the address space of the first virtual machine to addresses in the address space of the second virtual machine and flips the mapping of the machine memory of the first virtual machine and the machine memory of the second virtual machine between the logical addresses of the respective virtual machines.

8. A computing device according to claim 7, wherein the computer readable program code embodied in the virtual machine monitor comprises code that when run passes from the first virtual machine to the second virtual machine information to enable the system in the second virtual machine to allocate logical addresses to map to the remapped machine memory.

9. A computing device according to claim 7, further comprising:
   a system comprising a computer readable storage medium having computer readable program code embodied therein that when run in the second virtual machine records as a checkpoint in machine memory the state of the second virtual machine when running a process; and
   a system comprising a computer readable storage medium having computer readable program code embodied therein that when run in the first virtual machine restores a process from a checkpoint recorded in machine memory to run in the first virtual machine; and
   wherein the virtual machine monitor is arranged to remap machine memory containing a checkpoint from logical addresses in the address space of the second virtual machine to addresses in the address space of the first virtual machine.

10. A computing device according to claim 9, wherein the computer readable program code embodied in the virtual machine monitor comprises code that, when run after a process is restored in the second virtual machine from a checkpoint in remapped memory, copies remapped memory on writes by the process and preserves before-image copies.

11. A computing device according to claim 10, wherein the computer readable program code embodied in the virtual machine monitor comprises code that when run reconstructs the remapped memory using the before-image copies, and remaps the memory to logical addresses in the address space of the first virtual machine.

12. A method of migrating a running process from one virtual machine to another within a single physical computer wherein the logical memory spaces of the virtual machines are mapped to parts of a common machine memory, comprising:
   recording to machine memory at least some of the state of the first virtual machine;
   passing from the first virtual machine to a second virtual machine information concerning at least some of the state that was recorded;

using the passed information, allocating memory addresses in the logical memory space of the second virtual machine for the recorded information;
remapping the machine memory containing the recorded information from the logical memory space of the first virtual machine to the allocated memory addresses in the logical memory space of the second virtual machine;
restoring the second virtual machine to a state corresponding to the recorded information; and
resuming the process in the second virtual machine from the restored state;
wherein remapping the machine memory comprises matching memory to which one logical memory address space maps and that is to be remapped with other memory to which another logical memory address space maps, and flipping the mapping of said machine memory to be remapped and said other memory between said one logical memory address space and said other logical memory address space.

13. A method according to claim 12, further comprising remapping machine memory that was in use by the process when the process was stopped from the logical memory space of the first virtual machine to the logical memory space of the second virtual machine.

14. A method according to claim 13, wherein the passed information comprises information concerning the machine memory that was in use by the process.

15. A method according to claim 13, further comprising copying any page of remapped memory to which the resumed process writes, and maintaining an unaltered copy of the page as remapped and a copy of the page as subsequently written to.

16. A method according to claim 15 comprising, in the event of a failure of the migrated process, re-migrating the process by reconstructing the memory previously remapped to the second virtual machine, remapping the reconstructed memory to another virtual machine, providing the other virtual machine with information concerning the recorded information, restoring the other virtual machine to a state corresponding to the recorded information, and restarting the process in the other virtual machine from the restored state.

17. A method according to claim 16, wherein the other virtual machine is the first virtual machine.

18. A method according to claim 12, wherein the logical addresses in the address spaces of the first and second virtual machines between which the memory is remapped are the same.

19. A method according to claim 12, wherein the logical addresses in the address spaces of the first and second virtual machines between which the memory is remapped are different.

20. A method according to claim 12, further comprising altering an operating system in the second virtual machine before the restoring step, and resuming the process to run on the altered operating system in the resuming step.

21. A method according to claim 12, further comprising:
altering an operating system in the first virtual machine;
recording to machine memory further information concerning the state of the second virtual machine with the resumed process;
passing from the second virtual machine to the first virtual machine information concerning the recorded further information;
remapping the machine memory containing the recorded further information from the logical memory space of the second virtual machine to the logical memory space of the first virtual machine;
restoring the first virtual machine to a state corresponding to the recorded information; and
resuming the process on the altered operating system in the first virtual machine from the restored state.

22. A computer readable storage medium having computer readable program code embodied therein that when run on a computing device comprising first and second virtual machines with respective first and second logical memories that map to respective parts of a machine memory is arranged:
to cause the first virtual machine to save information concerning the state of a process running in the first virtual machine to machine memory;
to cause the computing device to remap the machine memory containing the state information to logical memory of the second virtual machine; and
to cause the second virtual machine to restore its state from the saved state information and resume running the process from the restored state;
wherein the code causing the remapping of memory between two logical address spaces comprises matching memory to which one logical address space maps and that is to be remapped with other memory to which another logical address space maps, and flipping the mapping of said memory to be remapped and said other memory between said one logical address space and said other logical address space.

23. A computer readable storage medium according to claim 22, further comprising program code to cause the computing device to map the remapped memory to logical addresses in the second logical memory that are the same as the addresses to which it was previously mapped in the first logical memory.

24. A computer readable storage medium according to claim 22, further comprising program code to cause the computing device to map the remapped memory to logical addresses in the second logical memory that are different from the addresses to which it was previously mapped in the first logical memory.

25. A computer readable storage medium according to claim 22, further comprising program code to cause the first virtual machine to save information concerning memory used by the process and the computer device to include said memory used by the process in the remapped machine memory.

26. A computer readable storage medium according to claim 25, further comprising program code to cause the computing device, when the recovered process alters the contents of the remapped memory, to copy at least an affected part of the memory and to maintain both altered and unaltered copies in separate pages of machine memory.

27. A computer readable storage medium according to claim 26, further comprising program code to cause the computing device to remap the memory used by the process to the first virtual machine using the unaltered copies of the altered memory, and to cause the first virtual machine to attempt to resume the process.

28. A computer readable storage medium according to claim 26, further comprising program code to cause the computing device to monitor the operation of the recovered process and, after achieving a criterion of successful recovery, to cease to maintain unaltered copies of memory altered by the process.

29. A computing device comprising:
first means for running processes using memory in first and second logical address spaces mapped to respective parts of a common machine memory;

second means for recording in machine memory state information for a process running in the first logical address space;

third means for remapping machine memory from logical addresses in the first logical address space to addresses in the second logical address space and for flipping the mapping of the machine memory between the logical address spaces; and fourth means for restoring the process in the second logical address space from the state information recorded in machine memory.

30. A computing device according to claim 29, further comprising means for passing from the first logical address space to the second logical address space information specifying at least the number and size of the areas of memory to be remapped.

31. A computing device according to claim 29, further comprising means for copying remapped memory on writes by the restored process and preserving unaltered copies.

32. A computing device according to claim 31, further comprising means for reconstructing the remapped memory using the unaltered copies, and means for remapping the memory to logical addresses in the first logical address space.

* * * * *